United States Patent Office 2,696,956
Patented Dec. 14, 1954

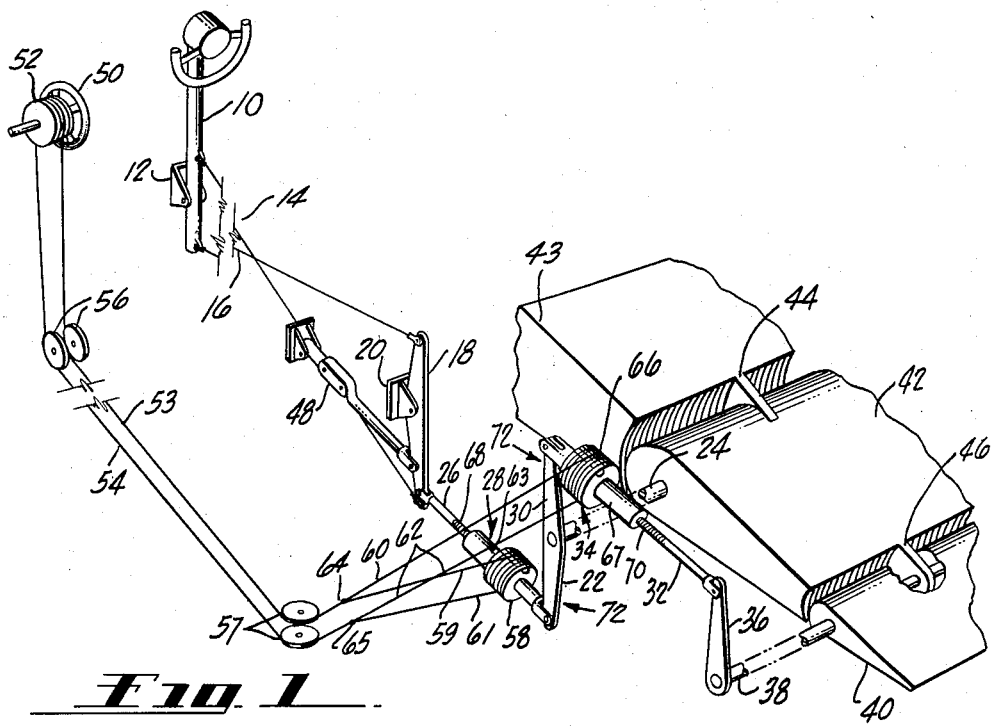

2,696,956

SAFETY MECHANISM FOR OPERATING CONTROL SURFACES

Alton E. Farr, Los Angeles, and Schuyler Kleinhans, Santa Monica, Calif., assignors to Douglas Aircraft Company, Inc., Santa Monica, Calif.

Application January 9, 1951, Serial No. 205,206

8 Claims. (Cl. 244—83)

This invention relates to mechanism for operating airplane control surfaces of the type characterized by cooperating main and auxiliary airfoils and more particularly to a secondary control system for causing movement of a main airfoil and a simultaneous differential movement of an auxiliary airfoil in order to trim the aircraft in flight or to control it in the event that the primary system is rendered inoperative.

It has for some time been the practice to provide a gust lock for the airfoil control system of an aircraft. Such a mechanism serves to lock the controls of the aircraft against operation and consequential damage by gusts of wind which play against the craft while it is resting on an airfield. In normal flight the gust lock is in its released position, thus enabling the pilot to actuate the control system.

Although such locks serve their intended purpose they also constitute a source of danger to the crew and passengers while the aircraft is in flight. Numerous near fatal accidents have occurred in flight by reason of the inadvertent or even deliberate engagement of the gust lock, thereby freezing the controls in an inoperative or locked position.

The secondary control system of the present application obviates this danger and additionally serves as a means for trimming the airfoil control surfaces while in flight, said trimming operation being carried out independently of any control surface actuation by reason of the primary control system. The control of the present application has the further advantage of being readily adaptable to primary control systems of varying mechanical constructions. Moreover, it is so tied into the primary system that it will still function in the event of mechanical failures in almost any portion of the primary system.

The overriding secondary control system comprises, in its broadest aspects, a secondary actuator which is connected to variable length link mechanism by such means as control cables. The variable length link forms a portion of the primary control system and connects said system to the main airfoil horn which actuates the main airfoil by rotation of a torque tube or the like. The primary system also contains a second variable length link which operatively connects the main airfoil horn to the auxiliary airfoil horn for simultaneous movement of said main and auxiliary airfoil. To the length varying mechanism contained in the second link is connected control means such as cables which are also operated by movement of the secondary actuator. Movement of the secondary actuator will either lengthen or shorten the links and thereby rotate the main airfoil relative to its fixed control surface and simultaneously rotate the auxiliary airfoil relative to the main airfoil to which it is rotatably hinged. Thus the secondary system serves both as an emergency control system and as a means for in-flight trimming of the control surfaces.

Although the degree of angular deflection of the control surfaces is proportionately less than that obtained by use of the primary control system, the deflection obtainable is sufficient to trim the airplane in flight or, in an emergency, to actually control and land the plane.

Other objects and advantages of this invention will be apparent from a study of the following description, read in connection with the accompanying drawings, wherein:

Figure 1 is a diagrammatic perspective view illustrating the secondary control system of the present invention operatively connected to a primary control system for a main and auxiliary airfoil;

Figure 2 is a sectional view partly in phantom illustrating diagrammatically the relationship and action of the control surface when actuated by the primary control system; and Figure 3 is a sectional view partly in phantom illustrating diagrammatically the relationship and action of the control surface when actuated from a neutral position by the secondary control system.

Referring now to Figure 1, the secondary control system of the present invention is shown as applied to a primary control system comprising a primary actuator or primary control column 10 which is pivotally mounted in a yoke 12 fixed to the airframe. Movement of the column actuates control means such as the cables 14 and 16 which in turn actuate a linkage mechanism which is here shown as a simple link or lever 18 pivotally mounted in a yoke 20 secured to the airframe. A rigid lever or horn 22 is secured to a standard torque tube 24 and is operated by a variable length push-pull rod or link 26 which is pivotally connected to the horn at one end and to the linkage mechanism 18 at its other end. Integral with the rod 26 is a length varying means which is here shown as a drum operated screw jack 28. A second horn 30 is secured to the torque tube 24 and may, as here shown, be a mere continuation of horn 22. It is pivotally connected to one end of a second variable length push-pull rod or link 32. Again the push-pull rod is provided with a drum operated screw jack 34 and its opposite end is pivotally joined to a third horn 36 which serves to rotate the torque tube 38 of the auxiliary airfoil 40 in a manner similar to the actuation of the main airfoil 42 by its torque tube. The main airfoil is rotatably connected to the fixed airfoil 43 by a hinge 44 while the auxiliary airfoil is similarly connected to the main airfoil by hinge 46.

Actuation of the primary control system will thus cause rotation of the main airfoil 42 about the axis of its torque tube 24 as shown in Figure 2. The hinge 46 causes translational movement of the auxiliary airfoil 40 and its torque tube 38 as is also illustrated in Figure 2. Since the screw jack 28 is not operated by the primary system no added rotation of the main airfoil is present. Likewise screw jack 34 is inactive and the auxiliary airfoil thus does not rotate relative to the main airfoil.

The primary control system is often provided with a gust lock such as the one indicated at 48 which serves to lock the primary system when the aircraft is not in use. This type of gust lock is completely disclosed in U. S. Patent No. 2,439,206 of April 6, 1948, issued to A. E. Farr. As we previously pointed out, the secondary control system of the present application is most advantageous when used with primary control systems that can be mechanically locked. However, as will subsequently be pointed out, the novelty of the present invention is not limited to use in conjunction with lockable primary systems.

Referring again to Figure 1, secondary actuating means such as a secondary control wheel or secondary cable actuator 50 is rotatably mounted in a position accessible to the pilot. Actuation of the wheel operates a cable-wound drum 52 which in turn operates control means such as the secondary cables 53 and 54. These secondary cables are movably carried by such means as pulleys 56 and 57 and their end portions 59 and 61 are operatively connected at their ends to the drum 58 of the drum operated screw jack 28 which controls the length of the first variable length push-pull rod 26.

Auxiliary airfoil control means such as the auxiliary airfoil cables 60 and 62 may be spliced or otherwise connected to the secondary control cables as shown at 64 and 65 and in turn operatively wound on the drum 66 of the drum operated screw jack 34 which controls the length of the second variable length push-pull rod 32.

By appropriate use of left and right hand threads 68 and 70 it is apparent that rotation of the wheel 50 will cause simultaneous rotation of the drums 58 and 66, thereby increasing or decreasing the length of the push-pull rods 26 and 32. These operations will cause rotation of the main airfoil 42 to and from a neutral or line of flight position as shown in Figure 3 and will also cause the auxiliary airfoil 40 to rotate relative to the main airfoil as is likewise illustrated in Figure 3.

For example, the pilot turns the secondary control wheel 50 in a manner to cause the secondary cable 54 to move toward and wind onto the drum 52. This action likewise causes end portion 61 and its splice 65 to move toward the pulley 57. This movement initiates a clockwise rotation (looking forward) of the drum 58 and internal screw 63 of the screw jack 28. This rotation causes the screw jack to travel toward the linkage mechanism 18 since the internal screw is in threaded engagement with the right hand threads 68 of the rod 26. This action decreases the length of the rod and thereby rotates horns 22 and 30 in a clockwise direction as indicated by arrows 72. The movement of a cable 54 likewise causes cable 62 to rotate drum 66 and internal screw 67 in a clockwise manner (looking forward). Threads on rod 32 are in this instance left hand threads. Hence the length of this rod will also be decreased. The decrease in the length of rod 26 causes the main airfoil 42 to rotate downwardly in a clockwise direction relative to the fixed airfoil 43. This action also traverses the auxiliary airfoil downwardly relative to the fixed airfoil. However, the decrease in the length of the rod 32 rotates horn 36 in a counterclockwise direction relative to the main airfoil thereby rotating the auxiliary airfoil in a counterclockwise direction relative to said main airfoil as indicated in Figure 3 at A. Rotation of wheel 50 in the opposite direction reverses the various movements described above.

It is thus apparent that the secondary system may be operated simultaneously with actuation of the primary system or it may be operated when the primary system is locked, jammed, damaged or simply held in a fixed position by the pilot. It is also apparent that the motions shown in Figure 3 may be imposed upon the primary system at a time when said primary system has already displaced the main and auxiliary airfoil from their neutral or line of flight position.

In emergencies the secondary control may be used to fly the aircraft although maneuverability will be decreased since the diameter of drums 52, 58, and 66, the lead of the threads 68 and 70, and the size and arrangement of the linkage system is such that several turns of the wheel 50 are required in order to obtain an angular movement of the main airfoil that is the equivalent of the angular movement obtained by movement of the primary actuator through an arc of a few degrees. This limitation is not a serious one for the ratio of secondary control wheel rotation in degrees to main airfoil rotation in degrees can be chosen at a value giving the required emergency maneuverability and at the same time providing the degree of sensitivity required for flight trimming adjustments.

The high ratio of wheel rotation to main airfoil rotation also makes certain that a second gust lock for the secondary control system is not needed for it is impossible to actuate the secondary system by attempting to rotate the main or auxiliary airfoil.

As was above pointed out, the secondary control system disclosed in the present application is not limited to use in conjunction with a primary control system of the type herein disclosed by way of illustration. The only requirement is that the torque tube horns 22 and 36 be operated by primary system links or push-pull transmitting means which are capable of being varied in effective length by any of the various known means such as screw jacks, hydraulic arrangements, cams, worm gearing and the like.

Although the now preferred embodiment of the present invention has been illustrated and described it is to be understood that the invention need not be limited thereto for it is susceptible to changes in form, detail, and application within the scope of the appended claims.

We claim:

1. A system for controlling the movement of a main airfoil and an auxiliary airfoil relative to each other and to a fixed airfoil, comprising the combination of: a primary control system including a primary control actuator, first primary control means operatively connecting said actuator to said main airfoil, and second primary control means operatively connecting said main airfoil to said auxiliary airfoil; adjustable means, integral with said first primary control means, for varying the angular relation of said main airfoil with respect to said primary control actuator; adjustable means, integral with said second primary control means, to vary the angular relation of the auxiliary airfoil with respect to the main airfoil; a secondary control actuator; and secondary control means operatively connecting said secondary control actuator to both of said adjustable means; whereby both of said adjustable means may be adjusted simultaneously and independently of said primary control actuator.

2. A system for controlling the movement of a main airfoil and an auxiliary airfoil of a control surface, comprising the combination of: a primary control system including a primary control actuator, first primary control means operatively connecting said actuator to said main airfoil, and second primary control means operatively connecting said main airfoil to said auxiliary airfoil; adjustable means included in said first primary control means so as to vary its effective length; adjustable means included in said second primary control means so as to vary its effective length; and a secondary control actuator operatively connected to both of said adjustable means to adjust them simultaneously and independently of said primary control actuator.

3. A flight control system for an aircraft including a main and auxiliary airfoil normally controlled by a primary control system including a primary actuator and a first variable length push-pull link connecting said main airfoil to said primary control system; gust lock means interposed in said primary control system between said first link and said primary actuator and effective when active to prevent operation of said primary actuator and to prevent axial displacement of said first link and a second variable length push-pull link connecting said main airfoil to said auxiliary airfoil, means operative for varying the length of said first link when the link is immobilized against lengthwise bodily displacement by said lock-means, means operative for varying the length of said second link when the link is immobilized against lengthwise bodily displacement by said lock-means, and means connecting said two length varying means together for simultaneous operation in common, whereby the length of said links may be simultaneously varied to actuate said main and auxiliary airfoil when said gust lock prevents operation of said primary control system.

4. A flight control system for an aircraft including a main and auxiliary airfoil, a primary control system having a primary control actuator, a first push-pull link incorporating length varying means and connected at one end to said main airfoil, primary control means operatively connecting the other end of said first link and said primary control actuator, a second push-pull link incorporating length varying means and connecting said main airfoil to said auxiliary airfoil, a secondary control actuator, and secondary control means operatively connecting said secondary actuator to the length varying means of said first and second links, whereby operation of said secondary actuator varies the length of said first and second links to thereby cause related simultaneous rotation of both the main and auxiliary airfoil independent of the operation of said primary actuator.

5. The combination with a primary control system for selectively actuating and immobilizing a main and an auxiliary airfoil, said system including a primary actuator and primary control-means, the control-means including gust-lock means of the type which occasionally remains locked in flight, said lock-means being interposed in said control-means between said actuator and said airfoils so as to receive and nullify airfoil actuating forces directed through the control-means toward the airfoils; said control-means including discrete force-transmitting members operationally interposed between said gust-lock means and said airfoils and normally lengthwise reciprocatable by the actuating forces to deflect said airfoils, each such member including coacting components therein, at least one of which is co-axially displaceable relatively to the other so as to vary the actual length of the member; of: a secondary control system for overriding the locked gust-lock means and operating said airfoils, said secondary system including a secondary actuator and secondary control means actuated thereby, the latter control means being operatively connected to the coaxially displaceable component in each of said force-transmitting members and the secondary control means being operable by said secondary actuator so as to effect said displacement of said displaceable components to vary the actual overall lengths of said force-transmitting members thereby to effect deflection of said airfoils even when said discrete force-transmitting members are immobilized against their normal lengthwise reciprocatory movement by the locked gust-lock.

6. The combination with a primary control system for selectively actuating and immobilizing a main and an auxiliary airfoil, said system including a primary actuator and primary control-means, the control means including gust-lock means of the type which occasionally remains locked in flight, said lock-means being interposed in said control-means between said actuator and said airfoils and being so organized and arranged with respect to said primary control means as to permit, when it is unlocked, the transmission of actuating forces thru said primary control means toward said airfoils; said primary control means including a first lengthwise translatory link directly connected to said main airfoil and operatively connected to said gust-lock means, said link including components arranged for mutal displacement to vary the actual overall length of the link, said primary control means also including a second lengthwise translatory link directly connected to said main airfoil and to said auxiliary airfoil so as to transmit operating forces applied thereto thru the first link, said second link including components arranged for mutual displacement to vary the actual overall length of the link; of: a secondary control system for overriding the locked gust-lock means and operating said airfoils, said secondary system including a secondary actuator and secondary control means actuated thereby, the latter control means being operatively connected to the one of said mutually displaceable components in each of said links, and said secondary control means being operable by said secondary actuator so as to effect the mutual displacement of said components thereby to vary the actual overall lengths of said links whereby to effect deflection of said airfoils even when said links are immobilized against lengthwise translation by said locked gust-lock means.

7. A system for controlling the movement of a main airfoil and an auxiliary airfoil of a control-surface unit, comprising: a primary actuator; primary control-means operatively connecting said actuator to said main airfoil and to said auxiliary airfoil, and including a first member operatively connected to said main airfoil and normally lengthwise translatable by said primary actuator to transmit actuating forces to said main airfoil, said member including means operable from an external locus to vary its length, and said primary control-means including a second member operatively connecting said main airfoil and said auxiliary airfoil and normally lengthwise translatable by said primary actuator to transmit actuating forces to said second auxiliary airfoil, said member including means operable from an external locus so as to vary its actual overall length; a secondary actuator; and secondary control-means operatively connected to each of said length-variable members and actuatable independently of said primary actuator so as to vary the actual overall lengths of said length-variable members simultaneously, thereby to deflect said airfoils.

8. A flight control system for an aircraft, comprising: a main airfoil; an auxiliary airfoil; a primary control actuator; primary control means connecting said primary control actuator to said main airfoil and to said auxiliary airfoil for normal operation of said airfoils, said primary control means including members constructed and mounted to normally enable lengthwise translation thereof, each of said members having coaxially arranged components adapted to be relatively axially displaced to vary the actual overall lengths of said members; gust-lock means interposed in said primary control means between said actuator and said airfoils and acting, when locked, to prevent the transmission of actuating forces to the airfoils, said lock-means being of the type which occasionally remains locked in flight so as to prevent translatory movements of said members; a secondary control actuator actuatable independently of said primary control actuator; and secondary control means connecting said secondary control actuator to one of said axially relatively displaceable components in each of said normally translatable members and operable so as to effect said relative axial displacement even when said members are locked against translation by said lock-means thus to provide for limited operation of said main and auxiliary airfoils independently of the condition of said primary control actuator.

References Cited in the file of this patent

UNITED STATES PATENTS

| Number | Name | Date |
|---|---|---|
| 1,766,025 | Junkers | June 24, 1930 |
| 2,183,279 | McCarthy et al. | Dec. 12, 1939 |
| 2,227,375 | Carlson | Dec. 31, 1940 |
| 2,325,548 | Roos et al. | July 27, 1943 |
| 2,401,790 | Noyes et al. | June 11, 1946 |
| 2,570,586 | Nix | Oct. 9, 1951 |
| 2,623,717 | Price | Dec. 30, 1952 |